(12) United States Patent
Silman (10) Patent No.: US 7,895,202 B2
(45) Date of Patent: Feb. 22, 2011

(54) QUALITY FILTER FOR THE INTERNET

(75) Inventor: Robert Silman, London (GB)

(73) Assignee: Tambar Arts Ltd., London (GB)

( * ) Notice: Subject to any disclaimer, the term of this patent is extended or adjusted under 35 U.S.C. 154(b) by 550 days.

(21) Appl. No.: 11/899,871

(22) Filed: Sep. 7, 2007

(65) Prior Publication Data

US 2009/0070331 A1     Mar. 12, 2009

(51) Int. Cl.
*G06F 7/00* (2006.01)
(52) U.S. Cl. .................................... 707/736; 707/754
(58) Field of Classification Search ................ 707/736, 707/754, 708, 709, 711, 713, 723, 748, 751; 704/233

See application file for complete search history.

(56) References Cited

U.S. PATENT DOCUMENTS

| | | | | |
|---|---|---|---|---|
| 4,860,360 A * | 8/1989 | Boggs | ......................... | 704/233 |
| 5,983,214 A * | 11/1999 | Lang et al. | ...................... | 707/1 |
| 6,308,175 B1 * | 10/2001 | Lang et al. | ...................... | 707/10 |
| 6,314,420 B1 * | 11/2001 | Lang et al. | ...................... | 707/3 |
| 6,775,664 B2 * | 8/2004 | Lang et al. | ...................... | 707/3 |
| 2002/0120609 A1 * | 8/2002 | Lang et al. | ...................... | 707/1 |

* cited by examiner

*Primary Examiner*—Hung T Vy
(74) *Attorney, Agent, or Firm*—Kenyon & Kenyon LLP (57) ABSTRACT

A method and system of rating media content is provided. The method and system provide for a selection of a criterion of quality. A standard quality profile is then determined for the criterion of quality. A filter having a similar quality profile to the criterion of quality is chosen. Statistical analysis may be employed in determining the similarities between the standard quality profile and the filter to be chosen. This filter can be applied to an unknown media sample to produce a rating of the media sample. Filter monitoring may be performed on the filter by comparing the ratings of a media sample from the criterion of quality and the filter.

31 Claims, 5 Drawing Sheets

QUALITY FILTER FOR THE INTERNET

FIELD OF THE INVENTION

The present invention generally is related to a system and method for filtering content and/or data. More specifically, the present invention is related to filtering material located on the Internet.

BACKGROUND

The Internet, like any other medium, has two principal means by which material can be judged. First, there is democratic judgment, where the public, without reference to individual background, experience, or education, judge the material by voting or rating or commenting on the basis of individual taste or whatever individual criteria they wish to apply. Second, there is quality judgment, where critics or specialists are selected or self-selected for their supposed talent experience or expertise in judging the material by rating and/or commenting on the basis of some critical notion of quality.

The Internet may be considered ideally suited to implement and express democratic judgments. In many systems, those systems simply count the visitors and present the cumulative and/or individual judgments of users. However, such systems only provide one form of judgment, namely a popular vote which expresses the taste (or agglomeration of individual criteria) of those voting. The Internet is not well-suited to implement and express quality judgments, which is the customary method for journals and specialist magazines with regard to movies or music or books where critical notions are applied to provide a qualitative assessment. The issue with bringing this type of process to the Internet is twofold: first, there sometimes is little agreement about the appropriate critical notions of quality which are to be applied; and second, there are not enough critics or specialists to deal with the quantity of material being deposited on the Internet.

DETAILED DESCRIPTION

Quality is not the same as taste. Taste is an indication of a person's likes or dislikes without necessarily any reference to quality. An expression of taste without reference to quality is "I like music of type p and I don't like music of type q". This expression is a legitimate indication of a person's taste in music, but illegitimate if it is meant to imply the quality judgment that "music of type p is better than music of type q". In other words there can be good and bad music of type p as much as there can be good and bad music of type q. Quality judgments are (or should be) independent of taste. For example, the quality judgment that "movie r is a masterpiece" should be a quality judgment about movie r based on a critical notion of quality about movies or even certain types of movies. A quality judgment might accord with the corresponding expression of taste as, for example, "movie r is a masterpiece and movie r is one of my favorite movies". The "movie r is a masterpiece" is the judgment of quality about the movie. The "movie r is one of my favorite movies" is an indication of a person's taste in movies. The quality judgment might also run counter to the corresponding expression of taste, as, for example, "I agree that movie r is a masterpiece, but movie r is a silent movie and I don't like silent movies." The "I don't like silent movies" is an expression of taste which runs counter to the judgment of quality that "movie r is a masterpiece."

In other words, an indication of taste tells something about the subject; and, a judgment of quality tells something about the object.

Accordingly, a quality filter is not the same as a taste filter. A quality filter operates according to some notion of what is good or bad about the object being judged, whereas a taste filter operates according to some notion about what accords or does not accord with a person's likes and dislikes.

For example, a person can view a movie critic as a taste filter. That is, a person may read a certain movie critic's reviews because the person expects to like movies the movie critic likes and dislike movies the movie critic dislikes. This appears to be a simple application of a taste filter by matching the person's taste against that of the movie critic. On this basis, a good movie critic would be someone who shares the person's taste, and a bad critic would be someone who does not share the person's taste. But movie critics generally are not chosen as good critics because of their supposed profile match of taste with that of their readers. The movie critics are chosen for their supposed ability to judge the movies according to some critical notion of quality. A movie critic generally is viewed as having a specific expertise in reviewing movies. Accordingly, it is this expertise that may allow the movie critic to provide a qualitative judgment as to what is good or bad about a movie irrespective of the readers' taste. This qualitative judgment is meant to tell the readers something about the movie itself. Persons generally are open to being informed and/or educated by the quality judgments of others. For example, those quality judgments might come from someone a person considers worthy of respect, or as having a relevant expertise. Over time, a person may grow to value the judgments of others and may work to see the good and bad qualities of some work of art based on critical notions. Accordingly, the same person eventually may change his/her taste and/or develop an educated taste based on critical notions. Such a result may have been caused solely by the quality judgments observed, something that would not have occurred if the person focused on taste alone. A good taste filter will select items which match the subject's likes and dislikes. A good quality filter will select items which match a critical notion of what is good and what is bad. A taste filter is a tool in selecting items that might appeal to a person on the basis of that person's pre-existing likes and dislikes. A quality filter is a tool in selecting items on the basis of whether the items are good or bad as judged by a critical notion. A taste filter lends itself to a marketing and sales function. A quality filter lends itself to a cultural, perspective enhancing, personal edification, and/or educative function.

A taste filter is based on a taste profile of a user. That is, a profile of the user's likes and dislikes is provided to be matched to potentially-attractive new products about which the user is currently ignorant. Some available systems provide such filters, e.g., online shopping venues. Some available online shopping venues provide a brief selection of additional products another buyer(s) selected, based on the situation that the user and the other buyer chose to buy the same first product. This is a filtering based on the taste of the other buyer, not on the quality of the additional products.

The user profile can be created from, e.g., categories, items, or both. Categories may include theater and cinema (movies), and suspense movies and comedies. Items may include movie m and movie n, or biscuit brand k and biscuit brand l. But, a taste profile can also be immensely complex, and, indeed, there is almost no limit to the complexity of a taste profile. Also, the more complex and complete the profile, the more likely that predictions based on it will be reliable. For example, a person goes into a supermarket and purchases items using a loyalty card, the supermarket can establish a profile of the user purchases in terms of categories and items. And under each category and/or item, it can store and analyze the data in terms of quantities and dates. So, for example, a single purchase might be an indication that a person tried the product and hated it, which is perhaps why that person never bought it again. This information might inform the category and/or item profile depending on whether the person bought another item(s) under that category or nothing further under that category. The purchase of items in the past which the person no longer purchases might be an indication that the person's taste has changed or that a new, potentially better, category and/or item has replaced an old one. A person purchasing different categories and/or items at different times might indicate the person may have visitors with different tastes or that the person's taste is cyclical or some other reasonable explanation. In the case of a computer network, it is possible to even track the categories and/or items a person rejects. If a person goes on to an online bookstore and brings up categories and/or items which the person does not subsequently purchase, this could be scored as an indifference or aversion to that un-purchased category and/or item.

The assembly of a taste profile can be passive as well as active. A passive version is described above where the system collects information based on a person's network browsing and an active version can involve a person asked to rate categories and/or items so that a profile of a person's taste can be actively established including a person's likes and dislikes. In addition, an assembled complex profile can be dynamically maintained so that changes in a user's taste can be monitored and the profile updated.

The purpose of establishing a taste profile is to draw a person's attention to products that the person has not yet experienced based on an expectation of what a person's taste profile suggests that person might like. To do this a taste profile system matches a person's taste profile with either 1) new product(s); e.g., a supermarket (or Internet site) which carries a product (or introduces a new product) which might be expected to appeal to a person based on its match with the person's taste profile; and/or 2) another and/or other similar taste profile(s) to see if the other(s) are liking products which the person has not yet tried but which should appeal to that person based on common taste profiles. Profile matching focuses on a) how to create a taste profile because every user's taste profile is different; and b) how to match this multiplicity of taste profiles so as to pass useful information from one user to another.

The creation of the algorithms which are used to compare and match taste profiles can be simple or complex. Some available methods include simply matching people that enjoy certain genres of film to other people that enjoy that same genre, e.g., action movies. More complex mechanisms may involve least squares methods, root mean squared error, pattern matching, and other statistical regression methods. These mathematical mechanisms used in profile matching as well as any of the other mechanisms described in the paragraphs above may also be used to augment the quality profiles and quality filtering mechanisms described below.

In all of the above, the word "filter" can be used for what is recommended as opposed to what is not, whether this be a category filter or an item filter. Hence a category filter might filter suspense movies from comedies to users whose taste profile indicates that they like suspense rather than comedy. Or an item filter (like an online bookstore) might filter books K, L, & M to a user who purchases book J by informing the user that other purchasers of book J also bought books K, L, & M.

Quality is different from taste. There is no user whose taste profile has to be established, instead there is a critical notion of quality.

A quality filter, especially when applied to the Internet, has to deal with a) the appropriate critical notion of quality which is to be applied; and b) the quantity of material being deposited on the Internet. The innovative features are the following. The first step is to circumvent having to define a critical notion of quality by instead selecting a group of individuals whose members are thought to share the critical notion of quality (whatever it might be). They become the "criterion of quality" for the filter. For example, one might select a group (from 1 person upwards) of competent movie critics to act as a "movie critic" criterion of quality for judging videos on the web: or, one might select a group (from 1 person upwards) of competent movie makers to act as a "peer review" criterion of quality for judging the videos. The appropriate critical notion of quality which is applied by the filter is the consequence of whatever criterion of quality is selected. The second step is to standardize the criterion of quality and thus make it susceptible to replication. An example of standardization would be the creation of a "standard quality profile" (SQP) based on a "standard sample" (SS). A simple example of a SQP with an associated small SS might be a single movie critic who is asked to rank a series of videos on the web on a scale of 1 to 10, where 1 is the worst and 10 is the best, so that a SS of 10 videos is selected where there is one video for each ranking point on the scale. However, if there is more than one member of a group who constitute a "criterion of quality", the members do not necessarily share an identical critical notion. For example individual movie critics in a group of movie critics who constitute the criterion of quality "movie critic" might not have a unanimous judgment about video r; some might think it a masterpiece, others might think it average or less.

For that reason, it might be necessary to create a more complex SQP based on a larger SS where each ranking point on the scale might have several videos and where the mean ranking point for each sample in the SS might have an associated standard deviation which could vary considerably between samples. The third step is to replace the member(s) who constitute the criterion of quality by a proxy (people or things) which can rank the SS like the SQP. A simple example of this might be inviting tens of thousands of people via the Internet to rank the SS of the "movie critics", without of course being informed of the score given by the movie critics (or anyone else). Those who score the SS within the confidence limits of the SQP are selected as the "filter". The fourth step is to apply the filter to unknowns. In the case of our example this would be employing the potentially thousands of new recruits, instead of the original set of movie critics, to rank the potentially tens of thousands of videos on the web. The fifth step is to apply a filter monitor to ensure that the filter remains true to the criterion of quality. A simple example of a filter monitor would be a spot check using a random video where both the new recruits and the original members rank the video to check whether the new recruits are maintaining their concordance with the criterion of quality. If the filter monitor indicates deterioration or corruption, then the filter would be recalibrated, in our example above by the exclusion of recruits who varied too far from the norm.

Videos on the Internet are just one item a user may wish to filter for quality. The present invention may be used for any item where qualitative assessments are used in rating including film, music, books and other forms of artistic expression. It is also important to note that sample media and other types of artistic expression have quantitative attributes, such as song length, film length, number of car chases, percentage of a shade of red in a picture, number of quarter notes etc. Sample media and other types of artistic expression also have non-numeric or qualitative attributes that can be converted to quantitative attributes for the purposes of database organization and software sorting/matching/filtering algorithms that may be used in this invention. For instance, painters, composers, violinists, directors, or actors can all be assigned values, placed in a database, or otherwise assigned quantitative attributes to make software/algorithmic manipulation easier. One may design human or software driven systems to extract this qualitative information and make the qualitative to quantitative transformations so that the quantitative aspects may be used in embodiments of this invention.

Figure 1:
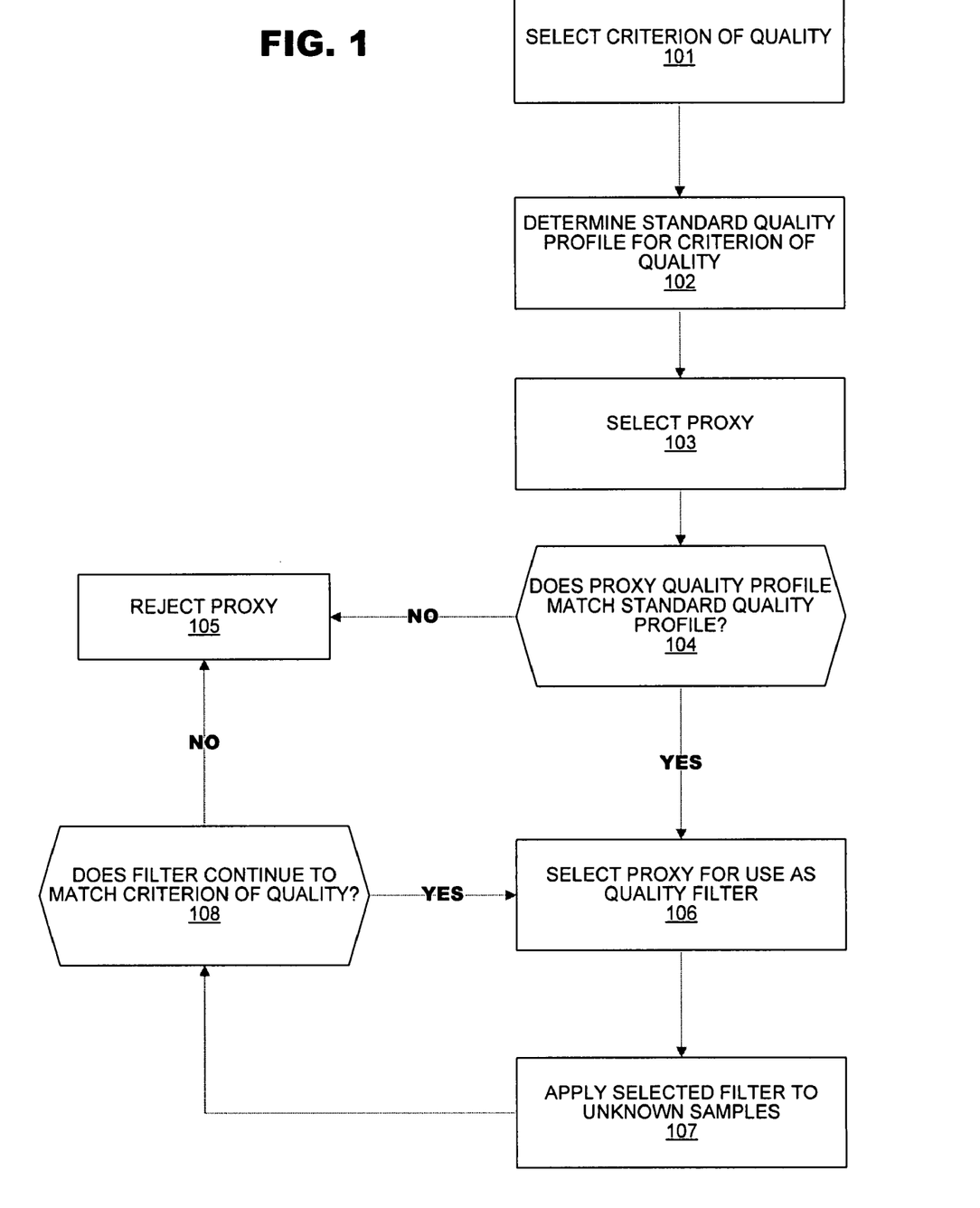
FIG. 1 shows a flowchart according to an embodiment of the present invention.

FIG. 1 shows a flowchart according to an embodiment of the present invention. A first step involves selecting a criterion of quality 101. The criterion of quality is the concrete manifestation of the critical notion of quality and can include, for example, an individual, a group of people, or potentially anyone or anything that can differentiate or rate items to produce a SQP. Other examples include a group of movie critics, a group of movie makers or any combination of the above. The potential flexibility in selecting the criterion of quality allows a user of the invention to use one or more criteria of quality so as to employ one or more quality filters each based on a different critical notion of quality. In an embodiment of the system, the end user may be the criterion of quality, but the end user is only one of a large number of options available.

After the criterion of quality is chosen, the second step involves determining the SQP for the chosen criterion of quality 102. It is a requirement that a criterion of quality be capable of rating some sample collection of items and thereby producing a SQP. In one embodiment, the criterion of quality is a group of five celebrated movie critics. There are many ways of establishing a SQP for a criterion of quality. Determining this criterion of quality's SQP may involve collecting data from the criterion of quality on various movie ratings. For example, these movie critics may all rate movies with a certain ranking system (e.g., a 1 to 10 scale, with 1 being the worst rating and 10 being the best rating). An example may take one hundred movies, where each of the five movie critics rates each movie. From these ratings some or all of these movies are chosen as the standard sample. The standard sample requires an adequate spread of movies in each of the rating categories. If the one hundred movies do not include movies in some of the rating categories, then further movies might have to be added until the standard sample had attained an adequate spread in each of its rating categories. The SQP is the statistical analysis of the standard sample to provide a statistical profile which can be matched against the statistical profile of others who are asked to rate the same standard sample. This statistical analysis can be simple or complex as described for taste profiles.

The third step is to choose a proxy capable of replicating the criterion of quality and its SQP 103. Once the SQP for a certain criterion of quality has been established then it is possible to match that SQP with quality profiles from other sources, such as the quality profiles derived from users of this system. For example, if the system were implemented in an online movie rating system, a user of that system or collection of users of that system may have a quality profile that matches the SQP. At its simplest, this could be the recruitment of further reviewers who are not themselves members of the criterion of quality class. An example of how this might be achieved is that applicants are invited to participate then applicants are invited to rank the same standard sample that the criterion of quality ranked. An embodiment tests if the applicant's quality profile matches the SQP (e.g., FIG. 1, block 104 and FIG. 2). Finally, applicants whose ranking profile (quality profile) falls within the prescribed limits for similarity of the SQP are invited to become qualified proxies for filtering unknown samples. Groups with quality profiles that do not match the SQP are rejected as proxies 105. Another embodiment of this invention may use groups of applicants or weighted groups of applicants. Groups of applicants with a quality profile that is similar to the SQP may be used as proxies for the criterion of quality 106.

Figure 2A:
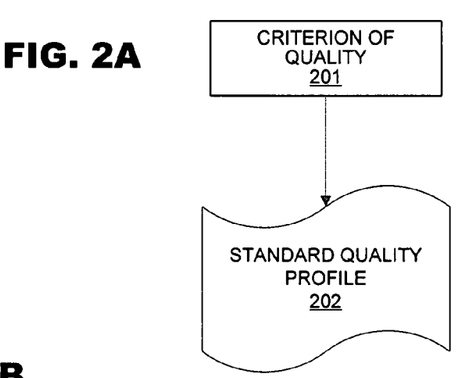
FIG. 2A shows a first graphical depiction of comparisons between standard quality profiles and quality profiles according to an embodiment of the present invention.

FIG. 2A shows a first graphical depiction of comparisons between standard quality profiles and quality profiles according to an embodiment of the present invention. The criterion of quality 201 produces a SQP 202.

Figure 2B:
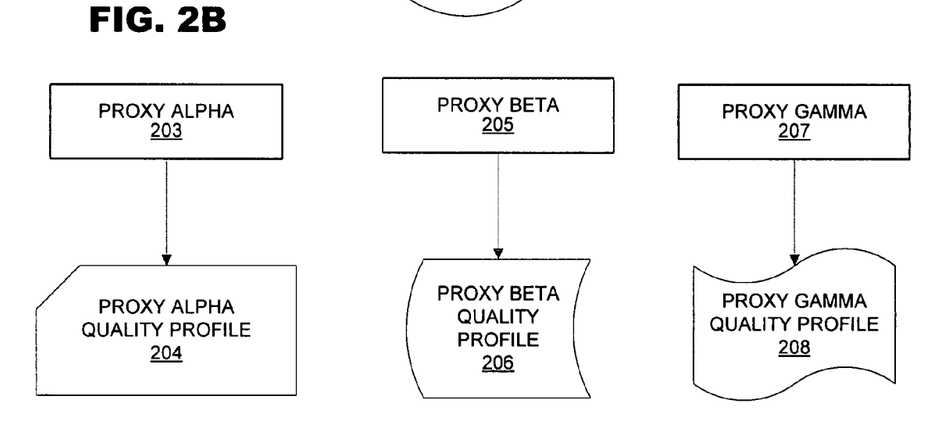
FIG. 2B shows a second graphical depiction of comparisons between standard quality profiles and quality profiles according to an embodiment of the present invention.

FIG. 2B shows a second graphical depiction of comparisons between standard quality profiles and quality profiles according to an embodiment of the present invention. Proxies alpha 203, beta 205, and gamma 207 also produce quality profiles, alpha 204, beta 206, and gamma 208.

Figure 2C:
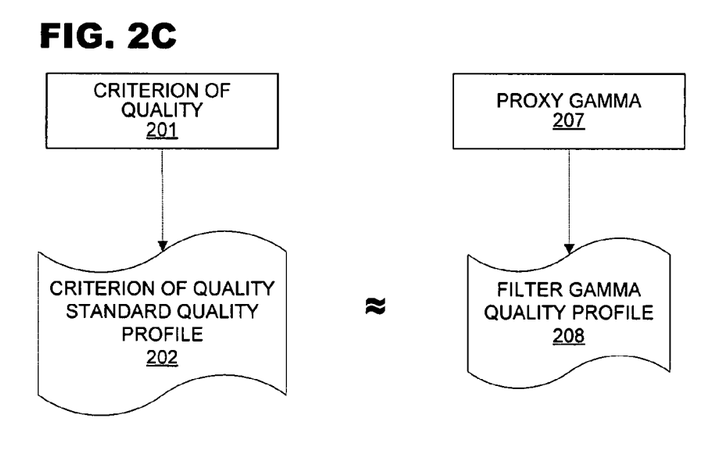
FIG. 2C shows a third graphical depiction of comparisons between standard quality profiles and quality profiles according to an embodiment of the present invention.

FIG. 2C shows a third graphical depiction of comparisons between standard quality profiles and quality profiles according to an embodiment of the present invention. The SQP 202 is eventually matched to the similar quality profile of proxy gamma 208. The substantially similar SQP results in gamma being chosen as a filter to approximate the criterion of quality. In yet another embodiment, an algorithm may be able to analyze the attributes of the quality profile and the SQP to indicate whether they match.

In yet another embodiment, the criterion of quality may create two or more sets of standard sample. In the example of the five movie critics, it might be that rating one hundred movies produces so many examples in each rating category that several sets of standard sample can be selected. In this example, selecting standard sample one would produce SQP one, and selecting standard sample two (composed of entirely different movies from those of standard sample one) would produce SQP two. An algorithm may be used to analyze the attributes of standard sample one in relation to the ranking of the movies. If successful, the algorithm could be chosen as a proxy. And, like with all proxies, the algorithm would be matched against a SQP. However, in this case, the algorithm cannot be matched against SQP one since this is the profile which was used to create the algorithm. So the algorithm would be required to rate standard sample two, and if the algorithm quality profile matched that of SQP two, the algorithm can be selected as a filter The fourth step involves using the proxy selected in step three to filter unknown samples 107. Continuing with the movie or video example, unknown samples may refer to videos on the Internet which have had no qualitative assessment or rating using our criterion of quality. The rationale is that if something conforms to the SQP created by the criterion of quality, it may be expected to conform to that criterion of quality outside the SQP. Using the embodiment of invention described above with human participants, these single or groups of users act as a rating filter for previously un-assessed videos—unknown sample content. Using the embodiment described above, a computer generated filtering algorithm may also act as the filter for use on these previously un-assessed videos. The chosen filter will presumably rate the previously un-assessed video content in a way similar to the criterion of quality.

A fifth step in one embodiment involves setting up a filter monitor system for ensuring the filter remains true to the criterion of quality (108 and FIG. 3). This is necessary in some embodiments because the critical notion of the criterion of quality might change while the filter proxy stays constant; in our example, the five celebrated movie critics may change/evolve their view about what is "good" and what is "bad," while the qualified recruits and/or mathematical algorithm that were chosen as a filter do not evolve to reasonably match the evolved taste from the chosen criterion of quality. Another reason for filter monitor is that the critical notion of the qualified recruits might change independent of any change in the criterion of quality. Additionally, the standard sample might be inappropriate/inadequate for deriving the true range of the SQP, and therefore application of the filtering algorithm to the unknown samples which lie outside the range of the standard sample (e.g., by their novelty or originality) might assess them differently from the criterion of quality. The purpose of adequate filter monitor is to ensure that the filter continues to conform in a way similar to the criterion of quality, and if it does not or if it deteriorates, to recalibrate the filter so that it does continue to conform. A filter monitor may be a continuous and ongoing process.

Figure 3A:
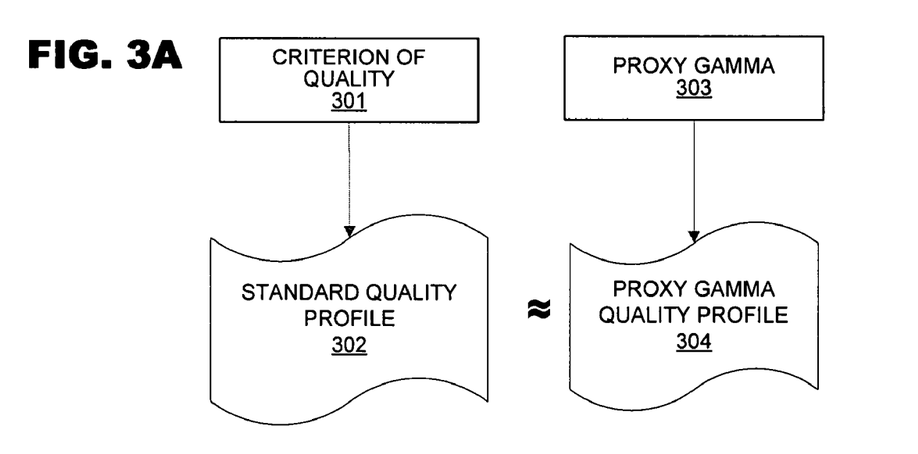
FIG. 3A shows a first graphical depiction of a filter monitor process according to an embodiment of the present invention.

FIG. 3A shows a first graphical depiction of a filter monitor process according to an embodiment of the present invention. The criterion of quality 301 produces the SQP 302 and it has been matched against the proxy gamma 303 quality profile 304.

Figure 3B:
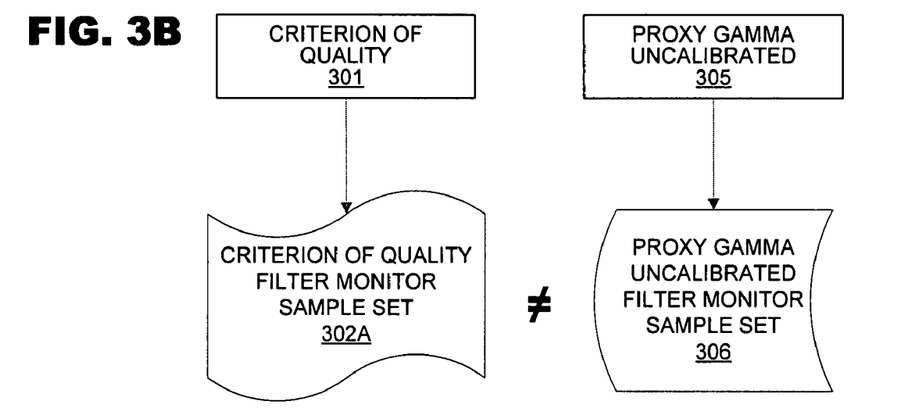
FIG. 3B shows a second graphical depiction of a filter monitor process according to an embodiment of the present invention.

FIG. 3B shows a second graphical depiction of a filter monitor process according to an embodiment of the present invention. Proxy gamma is selected as a filter, and over time, filter gamma becomes uncalibrated 305 as the critical notion of its participants change in relation to the criterion of quality 301. The filter monitor process in this case reveals the distortion by selecting specific or random samples rated by the filter 306 and having them rated by the criterion of quality 302a to reveal that the filter and the criterion of quality are now rating samples differently.

Figure 3C:
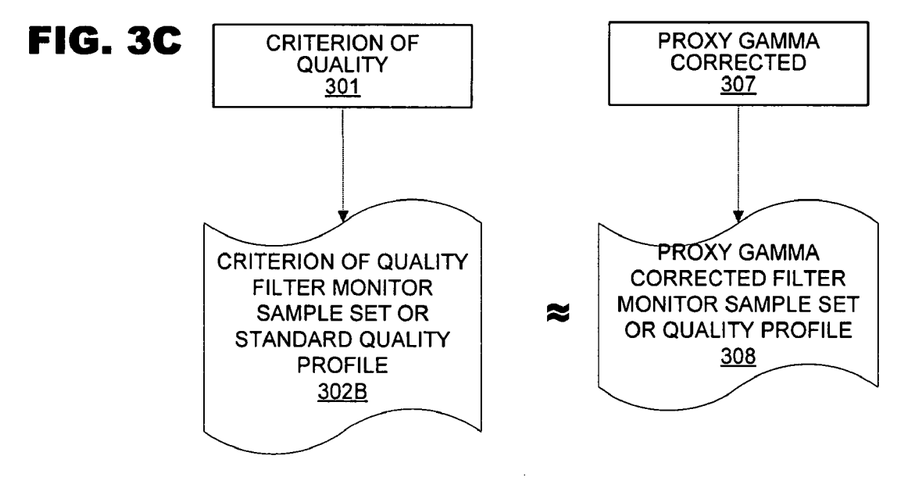
FIG. 3C shows a third graphical depiction of a filter monitor process according to an embodiment of the present invention.

FIG. 3C shows a third graphical depiction of a filter monitor process according to an embodiment of the present invention. Members are added or subtracted as necessary to form a corrected filter gamma 307. Alternatively a new standard sample and new SQP are produced by the criterion of quality and members of filter gamma are required to produce a new quality profile which is matched against the new SQP. Members are subtracted who do not match and members are added who do. The corrected filter gamma 307 produces a corrected filter gamma new quality profile 308 which matches the new SQP 302b and as a result corrected filter gamma 307 is competent to continue as a proxy filter.

In further embodiments, filter monitors can be of several types:

1) Choosing occasional unknown samples at random to use as filter monitor samples. An example would be asking the criterion of quality of the five celebrated movie critics to rank occasional unknown samples on an ongoing basis to be used as filter monitor samples for the filter.

2) Choosing specific unknown samples to use as filter monitor samples. An example for why an unknown sample might be flagged for special attention as a filter monitor sample could include that a group of qualified recruits have given a statistically abnormal rating spread for that sample.

3) Filter monitor processes can also be applied to elements within the filter which deviate from the norms of the filter as a whole. For example, an individual qualified recruit who deviates from the rating norm of the qualified recruit group as a whole, either in reference to a single unknown sample (in laboratory terms, an intra-assay coefficient of variation) or in reference to a spread of unknown samples (in laboratory terms, an inter-assay coefficient of variation) might be removed from the qualified recruit group.

The following is an example of a filter as applied to a criterion of quality which is growing dynamically. It is possible to create an application to rate videos on the Internet using this invention. The criterion of quality for this application could be esteemed video makers. The criterion of quality in this example could be referred to as "Peer Review." One step in the example is to recruit a group of Peer Reviewers (tens to hundreds). For this example, this Peer Review group may be provided a rating system which goes from 1=the worst to 10=the best. The Peer Review group may then be asked to rate new videos appearing on the Internet. The Peer Review group review should yield a spread of ratings to these new videos. As a next step, the makers of those videos which have been highly rated by the Peer Review are added to the Peer Review group. Through this or a similar process, the Peer Review group grows from the original (tens or hundreds) to a larger (hundreds or thousands) of peer reviewers. In time, the growing criterion of quality group will have rated tens of thousands of new videos.

For the next step, one may use, for example, the entire database of reviews for selecting the standard sample(s); or select 100+ videos from the database which include 10+ videos for each rating category i.e., 10+ rated as 1; 10+ rated as 2; 10+ rated as three; etc. as a standard sample. One may also repeat the previous step on different selection(s) of videos from the data base so as to provide several standard sample sets. Now, one could derive a SQP from the standard sample; (or SQPs from the standard sample sets).

To recruit thousands more reviewers as a filter for an embodiment of the invention, one would invite applicants to rate standard sample set(s). Some selection of the applicants may have quality profiles that match the SQP. These would be recruited to filter new videos (unknown samples).

In an embodiment, filter monitor processes may be applied to the new recruits that are acting as a "peer review" filter. The filter monitor processes could include, 1) the result(s) of the recruits compared with the result from the peer reviewers on the same unknown samples, or 2) the result of a single recruit compared with the result from the recruits as a group on the same unknown sample(s), or the results of a single recruit across selection(s) of unknown samples compared to the results of peer reviewer(s) and/or other recruit(s) across the same (or different) selection(s) of unknown samples. The filter monitor process can reveal if a recruit or group of recruits differ significantly from the criterion of quality. If so, then the recruit or group of recruits would be excluded from the filter group.

It will be appreciated that it is not necessary to define the critical notion of quality. Instead, all that is necessary is for a criterion of quality to be designated, namely someone or something who will supposedly judge quality of the item according to whatever critical notion of quality is being invoked.

Figure 4:
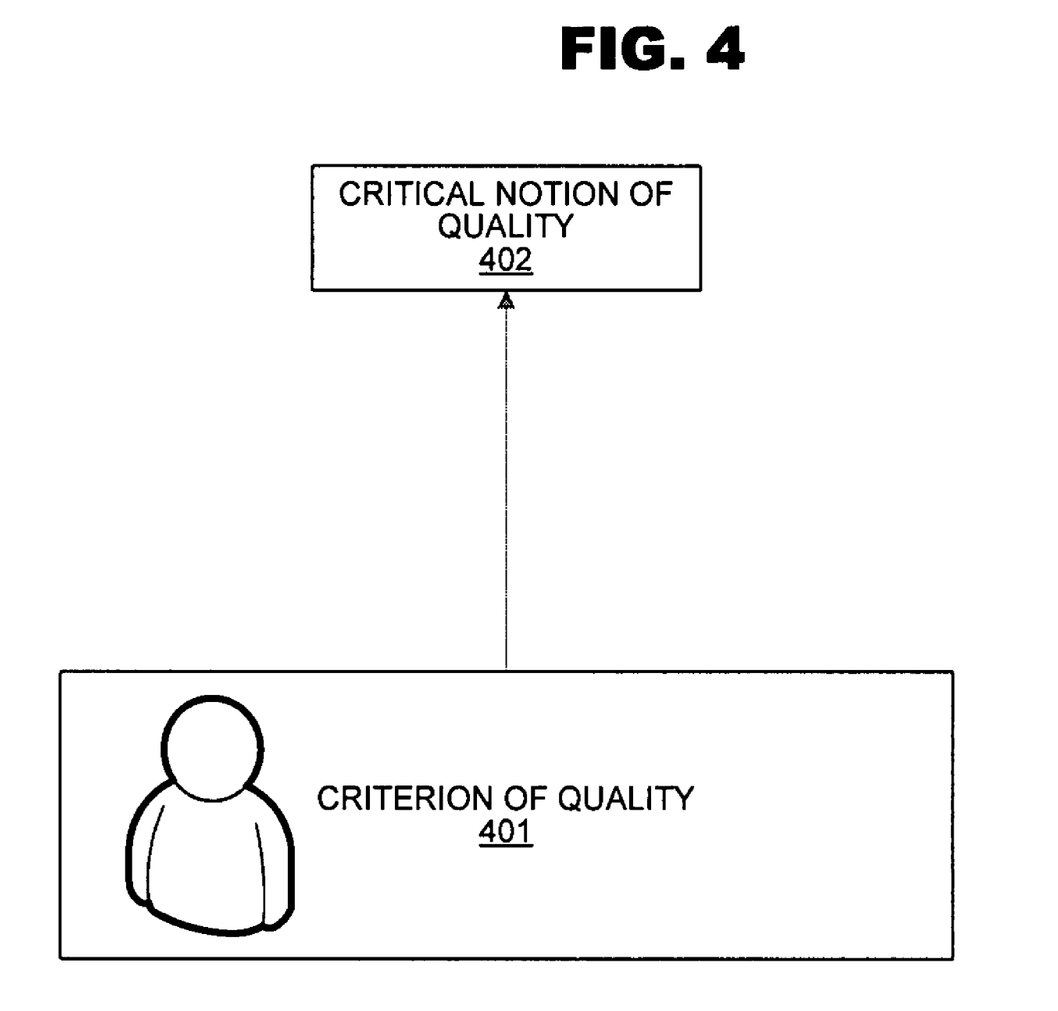
FIG. 4 shows a relationship between a critical notion of quality and a criterion of quality according to an embodiment of the present invention.

FIG. 4 shows a relationship between a critical notion of quality and a criterion of quality according to an embodiment of the present invention. For example, a critical notion of quality 402 is derived from, but different from, a criterion of quality 401. As discussed, a criterion of quality 401 may be a person, such as a film critic. The critical notion of quality 402 may be this person's idea of quality that is used to rate item or data.

Figure 5A:
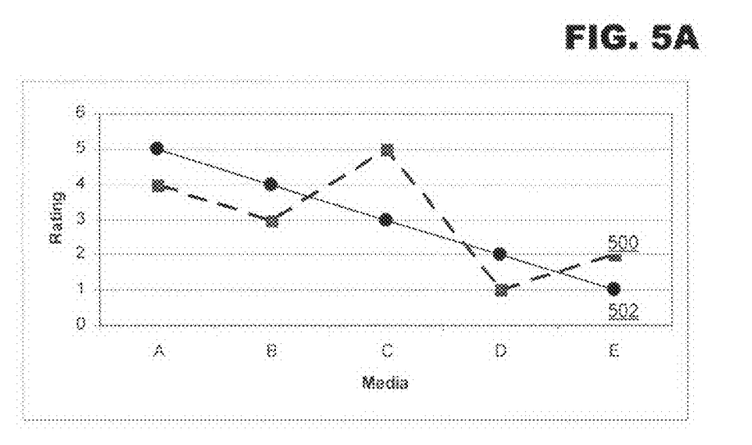
FIG. 5A shows a first example standard quality profile and a proxy quality profile according to an embodiment of the present invention.

FIG. 5A illustrates a first example standard quality profile and a proxy quality profile according to an embodiment of the present invention. A single member of a criterion of quality rates or ranks five items, such as movies, which are used in a SQP as later described. The criterion of quality may be, for example, a movie critic or another entity with expertise in determining a quality of movies, whatever the critical notion of quality may be.

Each movie may be rated on a scale of 1 to 5, with 5 being the highest quality. The criterion of quality may be given a set of movies to rank, and a standard sample set of movies (A, B, C, D, and E) may be selected. The standard sample set is selected to be a representative subset of rated movies with one movie of each score. The resulting standard quality profile 502 may represent the criterion of quality's critical notion of quality with regards to movies.

To replicate the criterion of quality, a proxy may be designated to rate the standard sample set and the proxy's score plotted as a proxy quality profile 500. From FIG. 5A, it can be seen that there is significant deviation between the proxy quality profile 500 and the standard quality profile 502. Thus, it may be concluded the proxy does not rate quality in movies in a similar manner as the criterion of quality.

The proxy may be another expert, a computer algorithm, or any other party with the potential to rate movies similar to the criterion of quality.

Figure 5B:
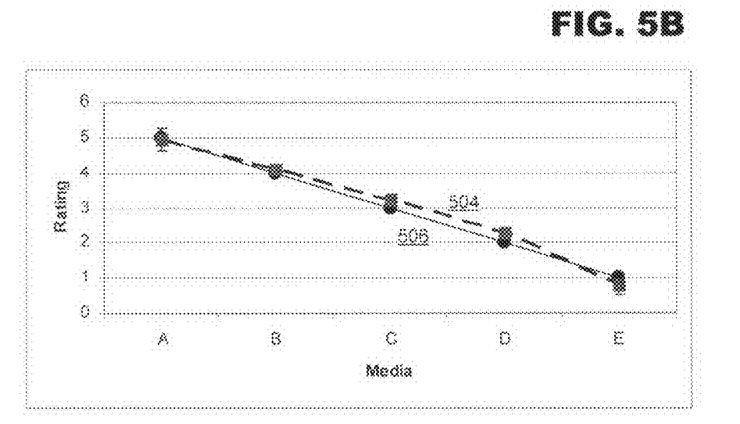
FIG. 5B shows a second example standard quality profile and a proxy quality profile according to an embodiment of the present invention.

FIG. 5B illustrates a second example standard quality profile and a proxy quality profile according to an embodiment of the present invention. The embodiment discussed in FIG. 5A may be improved by increasing a number of movies in the SQP so that each point on the scale has several rated movies and by adding a tolerance criteria to the proxy quality profile.

The standard quality profile 506 may be as described above, but instead of selecting one movie from the set of rated movies, the standard sample set of movies includes a plurality of movies for each score. For example, five movies may be selected for each of A, B, C, D, and E, resulting in 25 rated movies used in the standard sample set. Each movie in A may be selected to have a score of 5; each movie in B may be selected to have a score of 4, etc.

Similarly, the proxy quality profile 504 may involve a proxy rating the same 25 movies. Additionally, a tolerance may be calculated for each set of movies associated with a score. For example, the tolerance may be a standard deviation of the proxy ratings. The tolerance may be indicated by error bars above and below the proxy quality profile, as depicted in FIG. 5B.

If a proxy quality profile is within a tolerance of the standard quality profile, for example, by being within a 75% confidence range, the proxy quality profile may be accepted as a quality filter. That is, the proxy quality profile may replace the criterion of quality in judging quality of movies. Confidence range may be defined as a specified standard deviation from a mean.

For example, in FIG. 5B, the standard quality profile 506 is shown as a straight line with its points on the integers. In this FIG. 5B, where the standard quality profile 506 is based on, e.g., a criterion of quality being one person or a computer, the judgment on each movie is absolute. Thus, the standard quality profile 506 is shown having no standard deviation bars. The proxy quality profile 504 is shown having standard deviation bars because the proxy quality profile 504 varies from the standard quality profile 506.

Figure 5C:
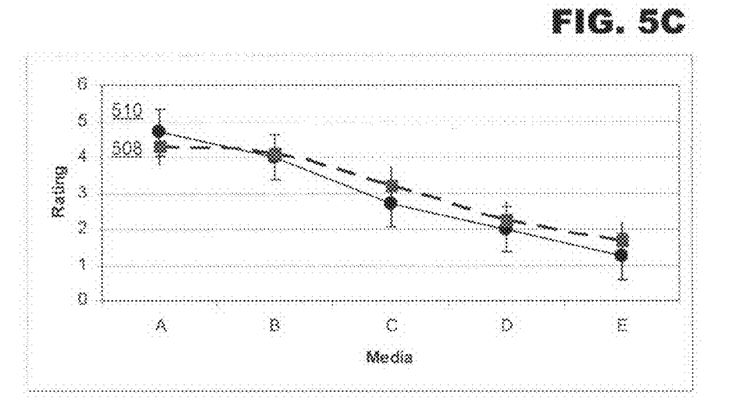
FIG. 5C shows a third example standard quality profile and a proxy quality profile according to an embodiment of the present invention.

FIG. 5C shows a third example standard quality profile and a proxy quality profile according to an embodiment of the present invention. The standard quality profile 510 may represent a group of movie critics rating the movies, while the proxy represents a group of laypersons rating the same movies. In this embodiment the group of movie critics are unlikely to have identical judgments and therefore the points on the SQP are likely to have standard deviations. If the proxy quality profile 508 sufficiently matches the standard quality profile 510, the movie critics may be replaced with the group laypersons in rating future movies. It will be observed that the standard quality profile 510 is an inverted S because it is unlikely a proxy consisting of a group of movie critics will ever agree on rating a subset of movies the highest or lowest scores.

It will be appreciated that more than one proxy may be designated for a criterion of quality. For example, a first group of laypersons may be selected from young, urban professionals. A second group of laypersons may be selected from laypersons who regularly watch movies. It will be appreciated that multiple proxies may be designated until an acceptable quality filter is found.

The quality filter may be subsequently monitored to ensure it continues to produce ratings similar to the criterion of quality. For example, from time-to-time, a new set of movies may be rated by both the quality filter and the criterion of quality and the results compared. If the quality filter no longer produces ratings within a tolerance to the criterion of quality, the quality filter may be corrected or discarded.

It will be appreciated that the standard quality profile is a line consisting of a plurality of points indicating rankings of items. A standard deviation of a standard quality profile may consist of two lines, a first line connecting all points one standard deviation above the profile points, and a second line connecting all points one standard deviation below the profile points.

In FIG. 5C, the standard quality profile 510 is exemplified as a non-straight line and as having a standard deviation bar for the points for the example situation in which the criterion of quality for the standard quality profile 510 is composed of several members. Thus, the judgment on each movie varies between the members. The proxy quality profile 508 data points each have their own standard deviation bars—separate from the standard deviation bars of the standard quality profile 510. The proxy quality profile 508 shows the variation from the standard quality profile 510.

An example embodiment of the present invention may be a method for rating items. The method may include selecting a critical notion of quality indicative of a quality of an item. The method may include selecting a criterion of quality which determines a quality of an item, each item associated with a quality. The method may include ranking a set of items by each item's associated quality. The method may include selecting a standard sample set from the ranked set of items, the standard sample set representing a range of quality. The method may include determining a standard quality profile from the standard sample set and the rankings associated with each item. The method may include selecting at least one proxy for the criterion of quality. The method may include ranking the standard sample set by the proxy and determining a proxy quality profile for the proxy. The method may include comparing a proxy quality profile with the standard quality profile. The method may include selecting the proxy as a quality filter if the proxy quality profile matches the standard quality profile. The method may include applying the quality filter to unranked items and ranking the unranked items. The method may include comparing the ranking of a filter monitor sample set by the criterion of quality and a ranking of the filter monitor sample set by the quality filter. The method may include discarding the quality filter if the ranking of the filter monitor sample set by the criterion of quality does not match the ranking of the filter monitor sample set by the quality filter. The filter monitor sample set may be selected from the ranked set of items by the criterion of quality and not included in the standard sample set. The method may include examining a quality filter for aberrant behavior of members. The method may include discarding an aberrant member from the quality filter. The quality filter may match the standard quality profile if within a predetermined standard deviation of the standard quality filter. The quality filter may match the standard quality profile if within a confidence interval. The confidence interval may be set by the user. The quality filter may match the standard quality profile if recognized by a pattern recognition module. The method may include selecting a second critical notion of quality indicative of a second quality of an item. The method may include selecting a second criterion of quality which determines a second quality of an item, each item associated with a second quality. The method may include ranking a second set of items by each item's associated second quality. The method may include selecting a second standard sample set from the second ranked set of items, the second standard sample set representing a range of second quality. The method may include determining a second standard quality profile from the second standard sample set and the second rankings associated with each item. The method may include selecting at least one second proxy for the second criterion of quality. The method may include ranking the second standard sample set by the second proxy and determining a second proxy quality profile for the second proxy. The method may include comparing a second proxy quality profile with the second standard quality profile. The method may include selecting the second proxy as a second quality filter if the second proxy quality profile matches the second standard quality profile. The method may include applying the second quality filter to unranked items and ranking the unranked items. The method may include accessing the set of items via the Internet. Each item is one of music, video, visual art, and text. The method may include providing the ranking of the unranked items by the quality filter to a user. The ranking of the unranked items by the quality filter may be provided to the user over the Internet.

Another example embodiment of the present invention may be a computer-readable medium including instructions adapted to execute a method for rating items. The method may include selecting a critical notion of quality indicative of a quality of an item. The method may include selecting a criterion of quality which determines a quality of an item, each item associated with a quality. The method may include ranking a set of items by each item's associated quality. The method may include selecting a standard sample set from the ranked set of items, the standard sample set representing a range of quality. The method may include determining a standard quality profile from the standard sample set and the rankings associated with each item. The method may include selecting at least one proxy for the criterion of quality. The method may include ranking the standard sample set by the proxy and determining a proxy quality profile for the proxy. The method may include comparing a proxy quality profile with the standard quality profile. The method may include selecting the proxy as a quality filter if the proxy quality profile matches the standard quality profile. The method may include applying the quality filter to unranked items and ranking the unranked items. The method may include comparing the ranking of a filter monitor sample set by the criterion of quality and a ranking of the filter monitor sample set by the quality filter. The method may include discarding the quality filter if the ranking of the filter monitor sample set by the criterion of quality does not match the ranking of the filter monitor sample set by the quality filter. The filter monitor sample set may be selected from the ranked set of items by the criterion of quality and not included in the standard sample set. The method may include examining a quality filter for aberrant behavior of members. The method may include discarding an aberrant member from the quality filter. The quality filter may match the standard quality profile if within a predetermined standard deviation of the standard quality filter. The quality filter may match the standard quality profile if within a confidence interval. The confidence interval may be set by the user. The quality filter may match the standard quality profile if recognized by a pattern recognition module. The method may include selecting a second critical notion of quality indicative of a second quality of an item. The method may include selecting a second criterion of quality which determines a second quality of an item, each item associated with a second quality. The method may include ranking a second set of items by each item's associated second quality. The method may include selecting a second standard sample set from the second ranked set of items, the second standard sample set representing a range of second quality. The method may include determining a second standard quality profile from the second standard sample set and the second rankings associated with each item. The method may include selecting at least one second proxy for the second criterion of quality. The method may include ranking the second standard sample set by the second proxy and determining a second proxy quality profile for the second proxy. The method may include comparing a second proxy quality profile with the second standard quality profile. The method may include selecting the second proxy as a second quality filter if the second proxy quality profile matches the second standard quality profile. The method may include applying the second quality filter to unranked items and ranking the unranked items. The method may include accessing the set of items via the Internet. Each item is one of music, video, visual art, and text. The method may include providing the ranking of the unranked items by the quality filter to a user. The ranking of the unranked items by the quality filter may be provided to the user over the Internet.

Another example embodiment of the present invention may be a system for rating items. The system may include a processor. The processor may be configured to select a critical notion of quality indicative of a quality of an item. The processor may be configured to select a criterion of quality which determines a quality of an item, each item associated with a quality. The processor may be configured to rank a set of items by each item's associated quality. The processor may be configured to select a standard sample set from the ranked set of items, the standard sample set representing a range of quality. The processor may be configured to determine a standard quality profile from the standard sample set and the rankings associated with each item. The processor may be configured to select at least one proxy for the criterion of quality. The processor may be configured to rank the standard sample set by the proxy and determining a proxy quality profile for the proxy. The processor may be configured to compare a proxy quality profile with the standard quality profile. The processor may be configured to select the proxy as a quality filter if the proxy quality profile matches the standard quality profile. The processor may be configured to apply the quality filter to unranked items and ranking the unranked items. The system may include a memory, the memory configured to store the quality filter and the set of items. The processor may be configured to compare the ranking of a filter monitor sample set by the criterion of quality and a ranking of the filter monitor sample set by the quality filter, wherein the filter monitor sample set is selected from the ranked set of items and not included in the standard sample set. The processor may be configured to discard the quality filter if the ranking of the filter monitor sample set by the criterion of quality does not match the ranking of the filter monitor sample set by the quality filter. The processor may be configured to examine a quality filter for aberrant behavior of members. The processor may be configured to discard an aberrant member from the quality filter. The quality filter may match the standard quality profile if within a predetermined standard deviation of the standard quality filter. The quality filter may match the standard quality profile if within a confidence interval and the confidence interval is set by the user. The quality filter may match the standard quality profile if recognized by a pattern recognition module. The processor may be configured to select a second critical notion of quality indicative of a second quality of an item. The processor may be configured to select a second criterion of quality which determines a second quality of an item, each item associated with a second quality. The processor may be configured to rank a second set of items by each item's associated second quality. The processor may be configured to select a second standard sample set from the second ranked set of items, the second standard sample set representing a range of second quality. The processor may be configured to determine a second standard quality profile from the second standard sample set and the second rankings associated with each item. The processor may be configured to select at least one second proxy for the second criterion of quality. The processor may be configured to rank the second standard sample set by the second proxy and determining a second proxy quality profile for the second proxy. The processor may be configured to compare a second proxy quality profile with the second standard quality profile. The processor may be configured to select the second proxy as a second quality filter if the second proxy quality profile matches the second standard quality profile. The processor may be configured to apply the second quality filter to unranked items and ranking the unranked items. The processor may be configured to access the set of items via the Internet, wherein each item is one of music, video, visual art, and text. The processor may be configured to provide the ranking of the unranked items by the quality filter to a user, wherein the ranking of the unranked items by the quality filter is provided to the user over the Internet.

Several embodiments of the present invention are specifically illustrated and described herein. Embodiments described herein may be combined in a variety of ways, with other steps, or re-arranged. However, it will be appreciated that modifications and variations of the present invention are covered by the above teachings and within the purview of the appended claims without departing from the spirit and intended scope of the invention. It is also noted that human reviewers, criterions of quality, recruits, SQPs, and filters as discussed in this invention may be substituted by software or software emulations on general computing systems.

What is claimed is:

1. A method for rating items, comprising:
   selecting a critical notion of quality indicative of a quality of an item;
   selecting a criterion of quality which determines a quality of an item, each item associated with a quality;
   ranking a set of items by the associated quality of the item;
   selecting a standard sample set from the ranked set of items, the standard sample set representing a range of quality;
   determining a standard quality profile from the standard sample set and the rankings associated with each item;
   selecting at least one proxy for the criterion of quality;
   ranking the standard sample set by the proxy and determining a proxy quality profile for the proxy;
   comparing a proxy quality profile with the standard quality profile;
   selecting the proxy as a quality filter if the proxy quality profile matches the standard quality profile; and
   applying, using a processor, the quality filter to unranked items and ranking the unranked items.

2. The method of claim 1, further comprising:
   comparing the ranking of a filter monitor sample set by the criterion of quality and a ranking of the filter monitor sample set by the quality filter; and
   effecting at least one of: a) discarding and b) correcting, the quality filter if the ranking of the filter monitor sample set by the criterion of quality does not match the ranking of the filter monitor sample set by the quality filter.

3. The method of claim 2, wherein the second sample set is selected from the ranked set of items and not included in the standard sample set.

4. The method of claim 1, further comprising:
   examining a quality filter for aberrant behavior of members; and
   discarding an aberrant member from the quality filter.

5. The method of claim 1, wherein the quality filter matches the standard quality profile if within a predetermined standard deviation of the standard quality filter.

6. The method of claim 1, wherein the quality filter matches the standard quality profile if within a confidence interval.

7. The method of claim 6, wherein the confidence interval is set by the user.

8. The method of claim 1, wherein the quality filter matches the standard quality profile if recognized by a pattern recognition module.

9. The method of claim 1, further comprising:
   selecting a second critical notion of quality indicative of a second quality of an item;

selecting a second criterion of quality which determines a second quality of an item, each item associated with a second quality;
ranking a second set of items by the associated second quality of the item;
selecting a second standard sample set from the second ranked set of items, the second standard sample set representing a range of second quality;
determining a second standard quality profile from the second standard sample set and the second rankings associated with each item;
selecting at least one second proxy for the second criterion of quality;
ranking the second standard sample set by the second proxy and determining a second proxy quality profile for the second proxy;
comparing a second proxy quality profile with the second standard quality profile;
selecting the second proxy as a second quality filter if the second proxy quality profile matches the second standard quality profile; and
applying the second quality filter to unranked items and ranking the unranked items.

10. The method of claim 1, further comprising:
accessing the set of items via the Internet.

11. The method of claim 10, wherein each item is one of music, video, visual art, and text.

12. The method of claim 1, further comprising:
providing the ranking of the unranked items by the quality filter to a user.

13. The method of claim 12, wherein the ranking of the unranked items by the quality filter is provided to the user over the Internet.

14. A computer-readable medium including instructions adapted to execute a method for rating items, the method comprising:
selecting a critical notion of quality indicative of a quality of an item;
selecting a criterion of quality which determines a quality of an item, each item associated with a quality;
ranking a set of items by the associated quality of the item;
selecting a standard sample set from the ranked set of items, the standard sample set representing a range of quality;
determining a standard quality profile from the standard sample set and the rankings associated with each item;
selecting at least one proxy for the criterion of quality;
ranking the standard sample set by the proxy and determining a proxy quality profile for the proxy;
comparing a proxy quality profile with the standard quality profile;
selecting the proxy as a quality filter if the proxy quality profile matches the standard quality profile; and
applying the quality filter to unranked items and ranking the unranked items.

15. The medium of claim 14, the method further comprising:
comparing the ranking of a filter monitor sample set by the criterion of quality and a ranking of the filter monitor sample set by the quality filter, wherein the filter monitor sample set is selected from the ranked set of items and not included in the standard sample set; and
discarding the quality filter if the ranking of the filter monitor sample set by the criterion of quality does not match the ranking of the filter monitor sample set by the quality filter.

16. The medium of claim 14, the method further comprising:
examining a quality filter for aberrant behavior of members; and
discarding an aberrant member from the quality filter.

17. The medium of claim 14, wherein the quality filter matches the standard quality profile if within a predetermined standard deviation of the standard quality filter.

18. The medium of claim 14, wherein the quality filter matches the standard quality profile if within a confidence interval, wherein the confidence interval is set by the user.

19. The medium of claim 14, wherein the quality filter matches the standard quality profile if recognized by a pattern recognition module.

20. The medium of claim 14, the method further comprising:
selecting a second critical notion of quality indicative of a second quality of an item;
selecting a second criterion of quality which determines a second quality of an item, each item associated with a second quality;
ranking a second set of items by the associated second quality of the item;
selecting a second standard sample set from the second ranked set of items, the second standard sample set representing a range of second quality;
determining a second standard quality profile from the second standard sample set and the second rankings associated with each item;
selecting at least one second proxy for the second criterion of quality;
ranking the second standard sample set by the second proxy and determining a second proxy quality profile for the second proxy;
comparing a second proxy quality profile with the second standard quality profile;
selecting the second proxy as a second quality filter if the second proxy quality profile matches the second standard quality profile; and
applying the second quality filter to unranked items and ranking the unranked items.

21. The medium of claim 14, the method further comprising:
accessing the set of items via the Internet, wherein each item is one of music, video, visual art, and text.

22. The medium of claim 14, the method further comprising:
providing the ranking of the unranked items by the quality filter to a user, wherein the ranking of the unranked items by the quality filter is provided to the user over the Internet.

23. A system for rating items, comprising:
a processor, the processor configured to,
select a critical notion of quality indicative of a quality of an item,
select a criterion of quality which determines a quality of an item, each item associated with a quality,
rank a set of items by the associated quality of the item,
select a standard sample set from the ranked set of items, the standard sample set representing a range of quality,
determine a standard quality profile from the standard sample set and the rankings associated with each item,
select at least one proxy for the criterion of quality,
rank the standard sample set by the proxy and determining a proxy quality profile for the proxy, compare a proxy quality profile with the standard quality profile, select the proxy as a quality filter if the proxy quality profile matches the standard quality profile, and apply the quality filter to unranked items and ranking the unranked items; and a memory, the memory configured to store the quality filter and the set of items.

24. The system of claim 23, the processor further configured to, compare the ranking of a filter monitor sample set by the criterion of quality and a ranking of the filter monitor sample set by the quality filter, wherein the filter monitor sample set is selected from the ranked set of items and not included in the standard sample set, and discard the quality filter if the ranking of the filter monitor sample set by the criterion of quality does not match the ranking of the filter monitor sample set by the quality filter.

25. The system of claim 23, the processor further configured to, examine a quality filter for aberrant behavior of members; and discard an aberrant member from the quality filter.

26. The system of claim 23, wherein the quality filter matches the standard quality profile if within a predetermined standard deviation of the standard quality filter.

27. The system of claim 23, wherein the quality filter matches the standard quality profile if within a confidence interval and the confidence interval is set by the user.

28. The system of claim 23, wherein the quality filter matches the standard quality profile if recognized by a pattern recognition module.

29. The system of claim 23, the processor further configured to, select a second critical notion of quality indicative of a second quality of an item, select a second criterion of quality which determines a second quality of an item, each item associated with a second quality, rank a second set of items by the associated second quality of the item, select a second standard sample set from the second ranked set of items, the second standard sample set representing a range of second quality, determine a second standard quality profile from the second standard sample set and the second rankings associated with each item, select at least one second proxy for the second criterion of quality, rank the second standard sample set by the second proxy and determining a second proxy quality profile for the second proxy, compare a second proxy quality profile with the second standard quality profile, select the second proxy as a second quality filter if the second proxy quality profile matches the second standard quality profile, and apply the second quality filter to unranked items and ranking the unranked items.

30. The system of claim 23, the processor further configured to, access the set of items via the Internet, wherein each item is one of music, video, visual art, and text.

31. The system of claim 23, the processor further configured to, provide the ranking of the unranked items by the quality filter to a user, wherein the ranking of the unranked items by the quality filter is provided to the user over the Internet.

* * * * *